United States Patent [19]

Grahame

[11] 4,186,417

[45] Jan. 29, 1980

[54] CAPACITOR PROTECTIVE SYSTEM

[75] Inventor: Frederick W. Grahame, Glens Falls, N.Y.

[73] Assignee: General Electric Company, Hudson Falls, N.Y.

[21] Appl. No.: 967,135

[22] Filed: Dec. 7, 1978

[51] Int. Cl.² .............................................. H02H 7/16
[52] U.S. Cl. ...................................... 361/15; 361/104; 361/274; 361/275; 361/58
[58] Field of Search ...................... 361/15, 16, 17, 58, 361/103, 104, 272, 274, 275, 273, 306, 309; 333/70 CR, 81 R, 81 A

[56] References Cited

U.S. PATENT DOCUMENTS

| | | | |
|---|---|---|---|
| 3,371,295 | 2/1968 | Bourgault et al. | 333/70 CR |
| 3,742,398 | 6/1973 | Brown | 333/70 CR |
| 4,107,758 | 8/1978 | Shirn et al. | 361/274 X |

*Primary Examiner*—Patrick R. Salce
*Attorney, Agent, or Firm*—James J. Lichiello

[57] ABSTRACT

A capacitor protective system involves the use of three interrelated concepts within the capacitor including a pressure sensitive circuit interrupter, a fuse, and a predetermined separation of capacitor leads along an electrode foil.

15 Claims, 6 Drawing Figures

CAPACITOR PROTECTIVE SYSTEM

This invention relates to a coordinated protective system for electrical capacitors, and more particularly to the combination in an electrical capacitor of circuit interrupters and resistances which are coactively effective to safely disconnect a capacitor from its circuit upon overcurrent conditions through the capacitor.

Certain capacitor applications require that the capacitors be equipped with electrical circuit interrupter devices such as switches or fuses to disconnect the capacitor from its circuit upon overcurrent and short circuiting conditions. Typical capacitor protective devices include a pressure sensitive interrupter (psi) as disclosed in U.S. Pat. No. 4,106,068, Flanagan, and internal fuses which are connected in the capacitor circuit within the capacitor, such as disclosed in U.S. Pat. No. 3,178,622 Paul et al, both of which are assigned to the same assignee as the present invention.

In the pressure sensitive interrupter, increasing pressure within the capacitor casing caused by abnormal temperature conditions causes a predetermined bulging of the capacitor cover. This bulging is utilized to mechanically open a set of contacts, separate a tap strap or otherwise to disconnect the capacitor from its circuit. In the internal fuse arrangement the capacitor taps or leads contain an interconnected fuse, and an abnormal or short circuit current flow through the fuse causes it to vaporize or melt and break the capacitor circuit.

There are some capacitor applications where the capacitor is connected directly across the line voltage, a typical capacitor being a 480 volt AC capacitor connected directly to a 480 volt source. Upon electrical short circuit conditions in such a capacitor as much as 10,000 amps may flow in the capacitor circuit. With a psi in the circuit, the capacitor could fail disastrously before the pressure interrupter could safely open the circuit because the buildup of pressure in the capacitor would be much too rapid.

A fuse which is connected into the capacitor circuit and which is external to the capacitor may be used to protect the capacitor. However, such fuses are relatively expensive and further require separate mounting means at significant additional cost. What is desirable is a relatively much simpler fuse structure located within the capacitor which then provides the housing, the mounting and the connection for the fuse. For short circuit currents in excess of about 1000 to 2000 amperes, simple practical fuses often do not operate effectively and consistently unless the current carrying capacity of the fuse is less than that required for normal capacitor overvoltage operation.

Both kinds of the above protective devices are in use and are, to a large extent, effective singly or in combination for the purposes intended. There remains, however, persistent failures of the doubly protected capacitors psi and internal fuse due to short circuiting in spite of the fact that both protective devices are utilized. Under some short circuiting conditions, the inrush current is so great that the protective devices fail to operate in a timely manner.

Accordingly, it is an object of this invention to provide current limiting means to render the double protective system effective under the conditions of a massive electrical short circuit in the capacitor.

SUMMARY OF INVENTION

It has been discovered that the capacitor taps or leads may be laterally displaced from each other a predetermined amount along their respective foil electrodes to limit the large inrush of current, upon short circuit conditions, by adding considerable resistance in the circuit.

This invention will be better understood when taken in connection with the following description and drawings in which FIG. 1 is a capacitor roll section which is doubly protected.

DESCRIPTION OF PREFERRED EMBODIMENT

Figure 1:
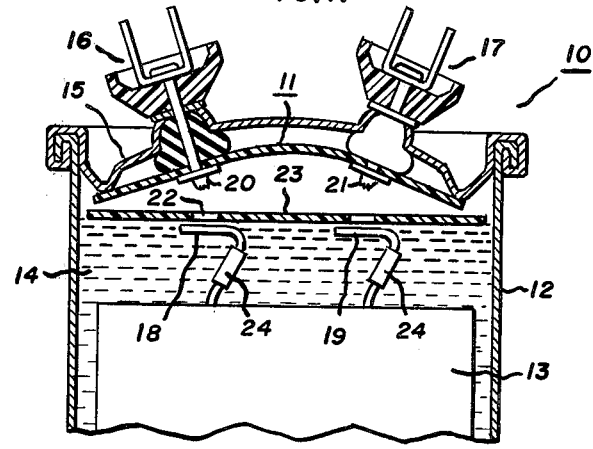

Referring now to FIG. 1, the capacitor 10 is fitted with a pressure sensitive interrupter assembly 11 which is shown in its operated condition. Capacitor 10 comprises a can or casing 12 in which there is a capacitor roll section 13 submerged in a dielectric fluid 14. The can 12 is sealed by means of a cover 15 having electrical terminals 16 and 17 therein which were, prior to the operation of the interrupter, connected to capacitor taps 18 and 19. The capacitor taps 18 and 19 were connected by welding the respective studs 20 and 21 on terminals 16 and 17, in a non slip fashion, through an aperture 22 in a stiff but flexible bridge member 23.

When the cover 15 bulges, as illustrated, because of overpressure conditions in the capacitor, the bridge member 23 is caused to flex until its bending stress becomes larger than the tear strength of the weld, at which time the welds break and the bridge member snaps back to its illustrated condition. The operation of the pressure interrupter is purely mechanical. Increasing pressure conditions in the case, whether caused by electrical problems or external temperature variances cause the cover to bulge and break the capacitor circuit.

In the event that the protection problem to be overcome is primarily electrical, e.g., short circuiting conditions permitting a large inrush of current into the capacitor, link type fuses 24 may be employed in addition to the pressure sensitive interrupter. Fuse link 24 is a typical fuse link comprising a necked down section of a tinned copper strip with a rubber, plastic, or other insulating material sheathing over the necked down section. The necked down portion of the link will melt or vaporize upon a predetermined large flow of current therethrough and this disconnects the capacitor from its circuit.

The capacitor protective devices as described show evidence of not being capable of effectively removing a capacitor from its circuit under some short circuit conditions. As noted, a typical 480 volt AC capacitor used for power factor correcting applications is connected directly across the line voltage. The inrush of current to this capacitor, under short circuit conditions, may easily exceed 5000 amperes. Ordinarily this inrush of current occurs very rapidly and the electrical energy must be rapidly dissipated. The pressure sensitive interrupter is much too slow to operate effectively because of the lag in mechanical and thermal operation. By the same token the fuse links are much too minimal to interrupt this heavy current and tend to vaporize explosively within the capacitor. The capability of a fuse of interrupting high currents of short duration may be a simple matter of design or test and is generally available from fuse manufacturers. In the typical capacitor, as described, the fuses 24 are rated at 20 amperes and are capable of interrupting about 2000 amperes at 480 volts AC. As a result, under severe conditions the capacitors may rupture spewing out the fluid 14 which is usually of a combustible nature.

Figure 2:
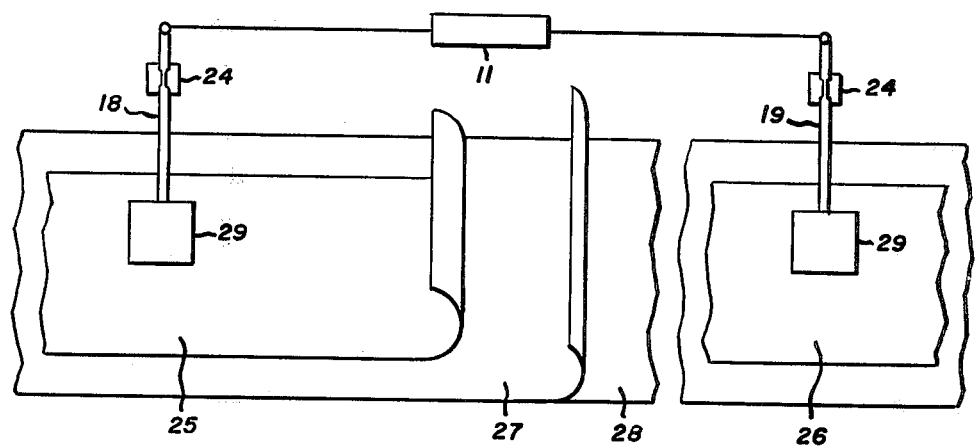
FIG. 2 is a schematic illustration of this invention as applied to the FIG. 1 capacitor.

It has been discovered that by separating the capacitor taps laterally along their respective electrode foils, more resistance can be added to the capacitor circuit to limit short circuit current. In FIG. 2 there is illustrated schematically a section of the capacitor roll 13. Roll 13 is typically made up of aluminum foil strip electrodes 25 and 26 separated by one or more dielectric strips 27 and 28 of paper and/or plastic. The capacitor taps 18 and 19 are usually of aluminum or tinned copper and are ribbon-like sections of about 0.003 inches (76.2$\mu$) thickness. A rectangular section of aluminum foil 29 usually somewhat thicker than the electrode foil material is electrically joined to the taps and lies adjacent the electrode foils to provide a good electrical connection. The combination of tap and aluminum section is called a flag tap.

Figure 3:
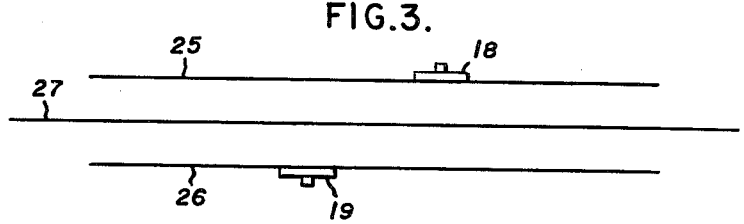
FIG. 3 is a schematic illustration of a prior art capacitor construction.

When using one tap per foil, it is the usual practice to place the flag taps near midlength on the aluminum foils and within a few inches of each other, as illustrated in FIG. 3. In FIG. 3 the taps 18 and 19 are positioned on opposite foil electrodes 25 and 26 with a dielectric strip 27 therebetween. The length of the foil electrodes made approach 100 feet (304.8 m) and an electrical balance is achieved when the flag taps are centralized, and the few inches of lateral spacing provides proper positioning of the taps in the final roll so that the taps are directly under the terminals 16 and 17 in the cover 15 as illustrated in FIG. 1. under these conditions when a short circuit occurs in the vicinity of a tap, there is a large surge of current to the opposite tap which may be in excess of 5000 amperes. Neither the fuse links 24 nor the pressure sensitive interrupter can handle this short circuit current effectively, although both are necessary for other fault conditions and operate effectively therefor.

In the present invention the taps are laterally displaced from each other to add considerable resistance in the circuit by increasing the length of aluminum foil in the electrical circuit between taps 18 and 19. Distances of 5 to 10 feet and more between the taps 18 and 19 have proven effective without contributing significantly to the electrical losses of a capacitor. The operation of a capacitor with displaced taps of this invention is as follows. For example, in FIG. 3 a large fault current enters one tap 18 and may flow over a length of an electrode foil towards one end or the other. At some point perhaps 50 feet from tap 18, the current flows through a short circuit to the opposing electrode foil and thence flows to the other tap 19. The longer length of electrode foil in the described flow path provides an increased resistance and thus limits the inrush of current to a value safely handled by the fuse 24. Tests have shown that in a short circuit where the supply circuit is capable of providing an inrush of 5000 amps, a short circuit at the ends of the electrode foils usually limits the current to about 2000 A or less. Under this latter condition both the fuses 24 and the pressure sensitive interrupter 11 have an opportunity to become effective and remove the capacitor from the circuit prior to any explosive effects. However, when the short occurs near both taps and there is no foil length to add resistance to the circuit, the capacitor sees the entire 5000 amps and the protective devices ae unable to operate timely and effectively.

The required lateral distance between taps may be effectively calculated for various capacitors by simple electrical equations. For example it is preferred to limit the value of a short circuit between the capacitor terminals to generally between 0.05 and 20 ohms. The formula to find D which is the distance in feet between taps is $$D = RW/L$$

Where
R is the minimum desired short circuit resistance
W is the aluminum foil width in inches for 0.22 mil thick foil (5.5$\mu$)
L is the aluminum foil resistance per inch of width and per foot of length.

Presently used foil is about 0.22 mils thick (5.5$\mu$) and its L value is about 0.061. For other foil thickness L=0.061×(0.22/T) (5.5$\mu$) where T is the foil thickness in mils or microns, respectively.

For a typical capacitor of this invention rated at 25 $\mu$f (microfarad) 480 volt AC, with 1.1 mil (28$\mu$) paper as the dielectric, an ester as the fluid 14 and a foil width of 6.56 inches (16.67 cm), the tap displacement D for 0.15 ohm resistance is D=(0.15×6.56=/0.061) 16.1 ft. (4.9 M). With a lateral displacement of about 16.1 feet (4.9 M) between taps the short circuit current will be limited to about 2000 amperes compared to over 5000 amperes without tap displacement.

Figure 4:
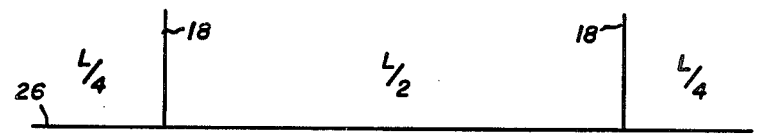
FIG. 4 is a schematic illustration of this invention as applied to capacitors having multiple taps for each foil electrode.
Figure 4:
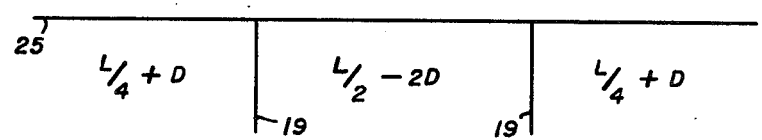

When displacing taps it is preferable to displace one tap or set of taps the full desired distance rather than to displace the tap or set of taps on each foil half the distance in opposite directions, i.e., for a 10 ft. (2.54 M) displacement one tap or set of taps is is moved 10 feet (2.54 M). The taps on the other foil are located at the normal points of lowest foil loss which are well known in the art. Some capacitors which operate at elevated temperatures are more susceptible to tap displacement because the displacement increases their power factor and further raises their temperature. In these instances tap displacement should be kept to a minimum. Where two sets of taps are used the length of the foil may be divided to place the taps as schematically illustrated in FIG. 4 Where three sets of taps are utilized one tap may be eliminated and the remaining taps may be positioned as schematically noted in FIG. 5. Electrical foil losses in the capacitor may be lowered by adding additional taps to one or both foils while still displacing the taps sufficiently to introduce the desired resistance as shown in FIG. 6.

Figure 5:
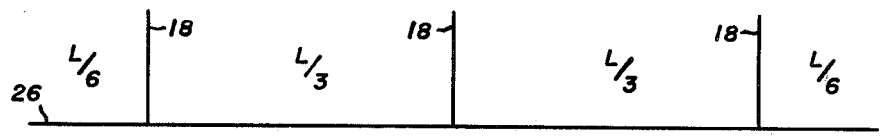
FIG. 5 is a schematic illustration of this invention which permits tap removal from multiple tap capacitors.
Figure 5:
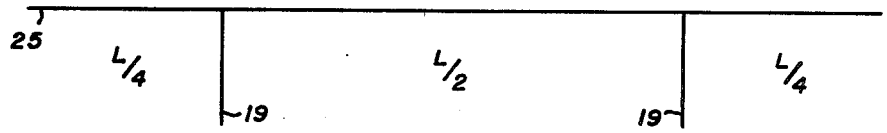
Figure 6:
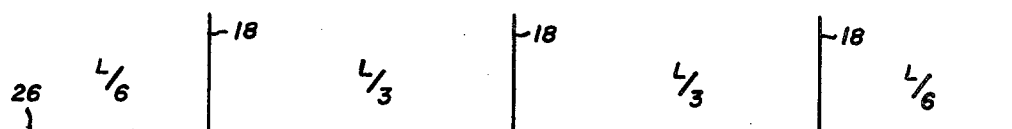
FIG. 6 is a schematic illustration of this invention which permits the addition of a tap to a capacitor electrode.
Figure 6:
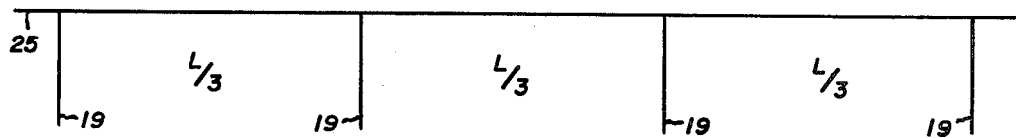

Referring now to FIG. 6 there is schematically illustrated an arrangement or application which ordinarily required three taps for each electrode foil. In the practice of this invention an additional tap 19 is included so that there are four taps on one electrode foil and three taps 18 on the other electrode foil. Taps 18 are separated in the same manner as taps 18 of FIG. 5, and taps 19 are equidistantly spaced as illustrated. In this connection such arrangements, as illustrated in FIGS. 5 and 6, may be defined as those wherein there is a plurality of taps on each electrode foil and no pair of taps on opposite electrode foils are spaced closer together than is required to limit the short circuit current to below about 3000 amperes with the capacitor operating at rated voltage. Also, as illustrated in FIGS. 5 and 6 the number of taps on one foil is at least one more (or less) than the number on the other foil. In FIGS. 4 and 5, L is the length of the foil electrode.

With respect to both protective devices, the psi and the fuses, the psi device may be utilized to break one or both tap connections 18 and 19, and fuse links may be employed with one or both taps 18 and 19. Ordinarily it is preferred, in the practice of this invention, to break both connections, i.e., the psi is operative as shown to break both connections, and two fuse links are employed. When only one connection is to be broken by the psi, and only one fuse link is to be employed, it is preferred to have the fuse link 24 break the tap connection not already broken by the psi. The psi device may be replaced by other forms of mechanically operating devices sensitive to pressure and/or temperature, and the fuse link may be combined with one so that it performs a dual purpose of mechanically separating or electrically melting.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by Letters Patent of the United States is:

1. In an electrical capacitor comprising a casing, a capacitor roll section in said casing, said capacitor roll section having opposed electrode foils separated by a dielectric strip, a dielectric fluid in said casing, electrical terminals on said casing, and tap means for each said foil electrodes and electrically connecting said opposite foil electrodes to said terminals, the improvement of a three fold electrical protective system for said capacitor comprising,
    (a) an electrical circuit interrupter in said casing sensitive to pressure/temperature conditions, and adapted to break the electrical circuit between a terminal and said roll section,
    (b) a fuse link in said casing and electrically connected in series with said pressure interrupter and sensitive to overcurrents in said taps to melt in response thereto and break the electric connection,
    (c) said tap means being laterally displaced from each other and from the ends of the foil electrodes along their respective electrode foils so that the length of electrode foil from one tap to a position opposite the other tap provides an electrical resistance of less than about 20 ohms in a short circuit through said length of foil which limits the current flow to below that of the rated maximum interruptible current limit of said fuse.

2. The invention as recited in claim 1 wherein said circuit interrupter is connected to break an electrical circuit through one of said taps.

3. The invention as recited in claim 1 wherein said fuse link is adapted to break the electrical circuit through the other of said taps of claim 2.

4. The invention of claim 1 wherein said circuit interrupter is pressure sensitive.

5. The invention as recited in claim 1 wherein said circuit interrupter is connected to a pair of taps, one on each side of the said opposite foil electrodes of said roll section.

6. The invention as recited in claim 1 wherein a fuse link is electrically connected in each said tap between said circuit interrupter and said roll section.

7. The invention as recited in claim 6 wherein said taps are laterally displaced from each other a sufficient distance so that the resistance of the electrode foil from one tap to a position opposite the other tap limits short circuit current to below about the general range of 2000 to 3000 amperes when connected to a circuit operating at the rated capacitor voltage.

8. The invention as recited in claim 7 wherein there are a plurality of taps on each foil so located that no pair of taps on opposite foils are spaced closer together than is required to limit the short circuit to below about 3000 amperes with the capacitor operating on a rated voltage circuit.

9. The invention as recited in claim 7 wherein the number of taps on one foil is at least one more than the number on the other foil.

10. The invention as recited in claim 7 wherein the lateral distance D in feet or centimeters between taps is given by the formula, $$D = RW/L$$

where

R is the minimum desired short circuit resistance
W is the electrode foil width in inches or centimeters, as the case may be,
L is the foil resistance per inch of width per foot of length or centimeters as the case may be.

11. The invention as recited in claim 10 wherein there are two taps on one side of an electrode foil and two taps on one side of the opposite electrode foil, and
    (a) the distance between the first two taps being about one-half the length of the electrode foil with the distance from the taps to the electrode foil ends respectively being one-quarter the length of the electrode foil, and
    (b) the distance between the two taps on the other electrode foil being one-half the length of the other electrode foil minus 2D and the distance from about end to a tap being one-quarter length of an electrode foil plus D of the D of claim 10.

12. The invention as recited in claim 10 wherein there are three taps on one foil electrode and two on the other foil electrode, and
    (a) the distance between the center tap and the two outer taps being one-third the length of the foil electrode and the distance between the outer tap and the end of the electrode foil being one-sixth the length of the electrode foil, and
    (b) the distance from the ends of the other electrode foil to the taps being respectively one-quarter the length of the electrode foil.

13. In the capacitor of claim 10 rated at about 480 volts, AC, the combination comprising,
    (a) the said fuse links being rated at about 20 amperes,
    (b) the distance between taps being in the range of 10 to 20 feet (3.04 M to 6.08 M) correlated to a foil electrode thickness of between 0.20 (6.5μ) and 0.25 (6.35μ) mil thick.

14. The capacitor of claim 10 wherein said pressure sensitive interrupter breaks the connection between the taps and the terminals.

15. The capacitor of claim 10 wherein said fuse link and said pressure interrupter are the same device.

* * * * *